United States Patent
Fabas et al.

(10) Patent No.: US 7,940,195 B2
(45) Date of Patent: May 10, 2011

(54) PROCESS AND SYSTEM FOR MODIFYING THE CONTENT OF AN ALARM MESSAGE ONBOARD AN AIRCRAFT

(75) Inventors: Nicolas Fabas, Castelmaurou (FR); Fabien Cases, Toulouse (FR); Laurent Signol, Colomiers (FR); Serge Blind, Pibrac (FR)

(73) Assignee: Airbus France, Toulouse (FR)

( * ) Notice: Subject to any disclaimer, the term of this patent is extended or adjusted under 35 U.S.C. 154(b) by 294 days.

(21) Appl. No.: 12/105,688

(22) Filed: Apr. 18, 2008

(65) Prior Publication Data

US 2008/0284618 A1 Nov. 20, 2008

(30) Foreign Application Priority Data

Apr. 19, 2007 (FR) .................................... 07 54579

(51) Int. Cl.
*G08B 21/00* (2006.01)
(52) U.S. Cl. .................. 340/945; 340/461; 340/539.19
(58) Field of Classification Search .................. 340/945, 340/971–972, 461, 463, 521, 523, 525, 534, 340/539.19, 571, 973, 825.5
See application file for complete search history.

(56) References Cited

U.S. PATENT DOCUMENTS

| | | | |
|---|---|---|---|
| 4,635,030 A | | 1/1987 | Rauch |
| 5,339,392 A | * | 8/1994 | Risberg et al. ................ 715/762 |
| 5,522,026 A | | 5/1996 | Records et al. |
| 5,574,648 A | * | 11/1996 | Pilley ............................ 701/120 |
| 5,838,261 A | * | 11/1998 | Lauta et al. ................... 340/945 |
| 6,356,859 B1 | * | 3/2002 | Talbot et al. .................. 702/188 |
| 7,131,136 B2 | * | 10/2006 | Monroe ........................ 725/105 |
| 7,298,289 B1 | * | 11/2007 | Hoffberg ...................... 340/903 |
| 7,400,293 B2 | * | 7/2008 | Fleming ................... 342/357.02 |
| 2005/0021518 A1 | * | 1/2005 | Snowdon et al. ................ 707/7 |

FOREIGN PATENT DOCUMENTS

| | | |
|---|---|---|
| EP | 0 780 746 A1 | 6/1997 |
| WO | WO 95/09103 | 4/1995 |
| WO | 0 721 414 | 7/1996 |

\* cited by examiner

*Primary Examiner* — Daniel Previl
(74) *Attorney, Agent, or Firm* — Oblon, Spivak, McClelland, Maier & Neustadt, L.L.P.

(57) ABSTRACT

A method for updating a content of a given warning message emitted in an aircraft by a monitoring system in case of detection of a particular state of at least one monitored system of the aircraft, the method including a step of delivery of a plurality of modification information items to a selection tool, each modification information item defining a modification of a content of a warning message capable of being emitted by the monitoring system, the selection tool being capable of selecting at least one information item among the plurality of modification information items in such a way as to permit modification of the content of the given warning message.

23 Claims, 4 Drawing Sheets

PROCESS AND SYSTEM FOR MODIFYING THE CONTENT OF AN ALARM MESSAGE ONBOARD AN AIRCRAFT

BACKGROUND OF THE INVENTION

1. Field of the Invention

The present invention relates to a method and an associated system for modifying a current content assigned to a warning message (or alarm message—or alarm) capable of being generated in an aircraft cockpit by a monitoring system known as flight warning system (or alarm calculator).

2. Discussion of the Background

In an aircraft cockpit, the flight warning system is an on-board system intended to forewarn the crew members of an abnormal situation concerning a monitored airplane system.

The monitored systems may include detectors or calculators relating, for example, to the engines, to the fuel tanks or to the landing gear.

Diverse flight warning systems are used in modern airline aircraft. In the Airbus A320 and A330/A340 family, for example, the warning system is a unit that can be replaced on-line (LRU for "Line-Replaceable Unit") known as "Flight Warning Computer" (flight warning computer). In the A380 and A400M family, the warning system is a software program known as "Flight Warning Application" (flight warning application), executed by modules that can be replaced on-line (LRM for "Line-Replaceable Module"), which integrate the integrated modular avionic technology (IMA: "Integrated Modular Avionics").

The flight warning system receives information originating from the monitored systems, and continuously determines whether an alarm must be tripped.

It communicates with the pilots by means of acoustic emissions, illumination of indicator lights and displays on screens.

In the architecture of the Airbus airplanes, these screens are ECAM screens (the acronym for "Electronic Centralized Aircraft Monitor" or centralized electronic monitoring, also known as EICAS for "Engine Indication and Crew Alerting System" in certain architectures). The ECAM is an assembly of visual and acoustic information and control systems in the all-screens instrument panel environment ("glass cockpit") of an aircraft.

When the flight warning system detects alarm-generation conditions, it causes the display of visual messages (text or symbolic) on these screens, the emission of acoustic signals or the illumination of indicator lights, all of these elements together constituting a warning message.

The content of the warning message supplies information items to the crew concerning the detected abnormal situation, and advises the crew of the action to be taken in response to this detection of an abnormal situation.

A list of warning conditions and default contents of warning messages associated with these warning conditions is recorded as the default setting during design of the flight warning system of the airplane.

These default contents of the warning messages were defined for the default configuration of the monitored system in question or of the monitored systems in question.

Now, a monitored system can be present on board the aircraft in different configurations, which vary from one airplane to another and vary in the course of the life of the airplane.

These different configurations are defined, for example, by the version of an on-board software program that controls the monitored system, by the characteristics of the physical equipment items constituting the monitored system or by the presence of a temporary anomaly of the monitored system, and such a change of configuration of a monitored system may or may not be temporary.

The action to be taken by the crew members in response to an abnormal situation depends in practice on the configuration of the monitored system on board the aircraft in question. It is therefore necessary to communicate information adapted to this configuration to the crew.

The solution implemented heretofore to communicate such information effectively to the crew in the detected abnormal situation, taking into account the precise configuration of the monitored system or systems on board the aircraft, is based on the use of portable on-board documentation.

This solution comprises the following steps, which are applicable to all abnormal situations for which the message to be received by the crew is not the default message:

a maintenance agent introduces, into the flight warning system, an information item indicating to the flight warning system that the content of the default visual message associated with the abnormal situation is obsolete, the crew is provided, before boarding, with portable documentation containing, among other elements, the replacement information, adapted to the configuration of the monitored system present on board the aircraft, in case of detection of the abnormal situation, a message is displayed on the ECAM screen to indicating the presence of a replacement information item in the portable on-board documentation, the default message associated with the abnormal situation not being displayed.

This solution is described in European Patent 0780746 and the equivalent U.S. Pat. No. 5,838,261.

The portable documentation is generally provided in printed form. It is known under the acronyms of QRH ("Quick Reference Handbook", or rapid reference booklet) or of FCOM ("Flight Crew Operating Manual", or operating manual for the crew).

It is updated regularly for each type of airplane in its operating phase, taking into account the particular features of the monitored systems of the type in question.

Now, numerous airplanes corresponding to a given airplane model are used by the airline companies, and in practice they have extremely varied sets of configurations of monitored systems.

The number of existing combinations of configurations of monitored systems increases very rapidly in the months following the start of commercialization of a new aircraft model.

Management and updating of numerous portable documentations according to the airplanes, to the evolution of the configurations of the different monitored systems from one airplane to another and, for one and the same airplane, according to this evolution in the course of time, represent a considerable workload and therefore a high cost.

SUMMARY OF THE INVENTION

It is therefore desirable to find a solution improving the methods currently used to update the contents of warning messages following a change of configuration of one or more monitored systems of the aircraft.

To solve this problem, there is proposed a method for updating the content of a given warning message emitted in an aircraft by a monitoring system in the case of detection of a particular state of at least one monitored system of the said aircraft, characterized in that the said method comprises a step in which a plurality of modification information items is delivered to a selection tool, each modification information item defining a modification of a content of a warning message capable of being emitted by the said monitoring system, a step in which a selection information item that depends on an effective configuration of the at least one monitored system is made available to the selection tool, the selection tool being capable of selecting at least one information item among the said plurality of modification information items according to the said selection information item, in such a way as to permit modification of the said content of the said given warning message.

In this way there is available a plurality of modification information items, among which it is possible to select one or more information items according to the real configuration of the monitored system or systems of the aircraft.

The plurality of information items forms a single set of information items that encompasses the information items applicable to a plurality of aircraft of a given model that are distinguished from one another by their respective evolutions in the course of time (change in parts, etc.).

This plurality of information items is applicable to aircraft in which the configurations of the monitored systems vary, a single set of modification information items avoiding the need for several sets of information items each having to be adapted to one aircraft, which would make management more difficult and less flexible.

This method makes it possible, in case of need for updating of the content of a warning message of the flight warning system, to achieve this update by means of a set of information items combined, for example, in a database created by the aeronautic manufacturer and containing a plurality of modification information items, each modification information item defining a modification of a content of a warning message capable of being emitted by the said monitoring system, this same database being usable for different types of a given aircraft model.

Preferentially, the method additionally comprises a step of selection by the said selection tool of at least one information item referred to as "chosen" from among the said plurality of modification information items, the said selection being effected according to a selection information item that depends on an effective configuration of the said at least one monitored system present on board the said aircraft.

Preferably, the method additionally comprises a step of modification of the said current content on the basis of the said information item chosen by the selection tool from among the plurality of modification information items according to the said selection information item.

This characteristic permits the flight warning system to have the new content available at a dedicated memory location, immediately available for use in case of detection of the abnormal situation.

According to one embodiment, the said monitoring system is part of the on-board electronics of the aircraft, and the said selection tool is a system separate from the on-board electronics of the aircraft or outside of these electronics or even outside of the aircraft, the said method additionally comprising a step of delivery of the said selection information item to the said selection system and a step of transmission of the chosen information item into the on-board electronics of the aircraft.

This solution means that a selection tool does not necessarily have to be included in the on-board electronics of the aircraft, which simplifies the development and use of this tool. The content selection tool can therefore be a tool installed on the ground in a maintenance room or a portable tool transported by a maintenance agent.

According to another embodiment, the said monitoring system and the said selection tool are part of the on-board electronics of the aircraft.

That allows the maintenance operator to easily achieve the update, by delivering to the on-board electronics a database containing a plurality of modification information items, the selection tool then being able effect the selection of the chosen information item from among the plurality of information items, and the new content then being available to the monitoring system, since this, like the selection tool, is part of the on-board electronics of the aircraft.

On this subject it is recalled that the on-board systems of an aircraft are interconnected by information-communication networks. Consequently, the new content selected by the selection tool is available to the monitoring system since the selection tool is part of the on-board electronics of the aircraft.

For example, the monitoring system can interrogate the selection tool, which then responds by delivering thereto the new content, selected a priori. Alternatively, the selection tool can transmit the new content to the monitoring system as soon as the content is selected. According to another solution, it can wait to be interrogated before if effects the selection and transmits the new content.

According to one embodiment, the method comprises a preliminary step of updating a selection information item in a memory of an electronic storage system during an intervention on the said at least one monitored system.

The selection tool can advantageously be the flight warning system itself, since this is equipped with a function for selection of modification information items, which has the advantage of facilitating the design of the device.

Preferentially, the method additionally comprises a step of delivery of the said selection information item the said selection tool via a man-machine interface.

This solution is particularly advantageous in connection with implementation of an aircraft maintenance project.

In effect, since implementation of an aircraft maintenance project is a complex task, it is not always easy to predict, prior to the start of the maintenance project, what will be the configuration of all monitored systems of the airplane at the end of the project, since different chance events or delays may occur in the course of the project.

The presented solution makes it possible to effect the update of the flight warning system at the end of a maintenance project in particularly easy manner, regardless of the configuration of the monitored systems of the aircraft at the end of the project.

In effect, delivery via a manual interface offers flexibility in delivery of the selection information item by a maintenance operator at the end of a maintenance project.

Alternatively, the method additionally comprises a step of delivery of the said selection information item to the said selection tool via a downloading interface.

That is particularly advantageous when several modifications of different warning message contents are made at the same time. In effect, in this case, the number of selection information items necessary to effect the modifications can be high.

The use of a downloading interface and of an information medium containing a database comprising these selection information items makes it possible to proceed rapidly and automatically to the introduction of these selection information items into the selection tool.

According to an alternative embodiment, the selection information item is made available to the said content selection tool by an electronic system of the said aircraft referred to as "storage" system, which stores the said selection information item, and in the memory of which the said selection information item is updated after each intervention on the monitored system.

The monitoring system can interrogate the storage tool, which then responds by delivering the selection information item thereto. The storage tool can advantageously be the flight warning system itself, or a data downloading system.

This solution is particularly advantageous because it reduces the number of tasks to be performed by the maintenance agent, since he merely has to deliver the plurality of modification information items to the selection system without having to deliver selection information thereto, such as an information item about the effective configuration of the monitored systems, the selection then taking place automatically.

In addition, according to a particularly advantageous characteristic, the delivery of the said plurality of modification information items to the said selection tool is effected via a downloading interface.

That makes it possible to effect the delivery of the plurality of contents rapidly and easily regardless of the volume of information items represented by the plurality of modification information items.

Preferentially, the warning message is a visual message, or even a text.

According to a second aspect of the invention, it proposes a system for updating a content of a warning message emitted in an aircraft by a monitoring system, in case of detection of a particular state of at least one monitored system of the said aircraft, characterized in that the said system comprises one or two or all three of the three following elements:
  means for delivering a plurality of modification information items to a selection tool, each modification information item defining a modification of a content of a warning message capable of being emitted by the said monitoring system,
  means for selection by the said selection tool of at least one information item referred to as "chosen" from among the said plurality of modification information items, according to a selection information item,
  means for making available to the said selection tool a selection information item that depends on an effective configuration of the said at least one monitored system.
  means for modifying the said content on the basis of the said chosen information item.

The invention also provides an aircraft subassembly and an aircraft comprising an updating system such as presented hereinabove.

According to particular characteristics, the selection (or extraction) of the information item referred to as "chosen" from among the plurality of information items can result in the generation of an information database that can be stored permanently or temporarily in a memory saved on a portable information medium, such as a USB key, a diskette or a CD ROM, or transmitted by radio waves or by a data-transmission network.

BRIEF DESCRIPTION OF THE DRAWINGS

Other characteristics and advantages of the invention will become apparent in light of the detailed description hereinafter with reference to FIGS. 1-4, which are diagrams representing four different embodiments of the method and of the device according to the invention.

DETAILED DESCRIPTION OF THE PREFERRED EMBODIMENTS

Figure 1:
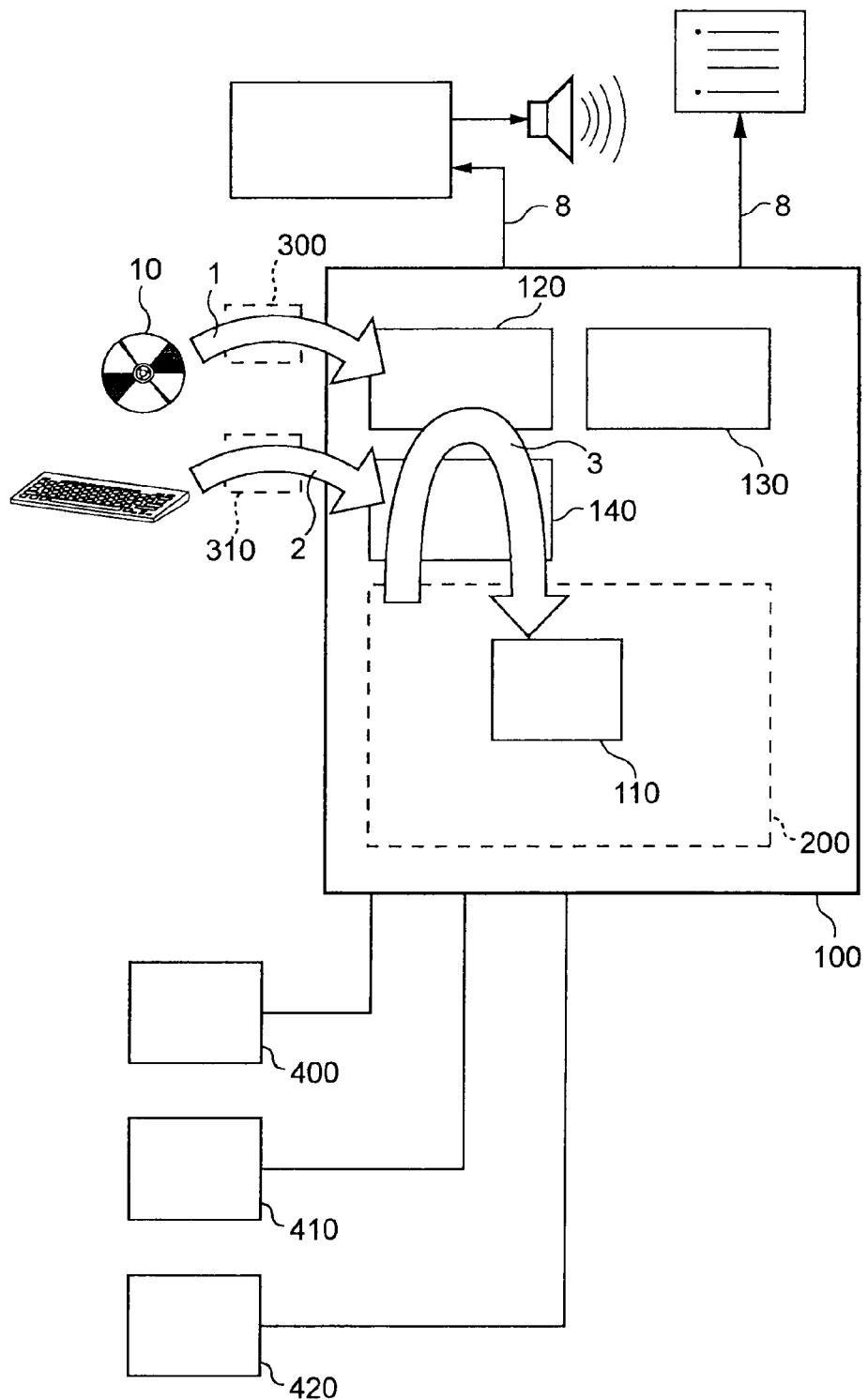

A first reconfigurable on-board aircraft system represented in FIG. 1 comprises an application 200 executed by an avionic module 100. It is recalled that on-board aircraft systems are constructed on the basis of specific electronics and data processing (embedded systems).

Application 200 is an on-board flight monitoring system (known in English terminology by the term "Flight Warning System") in software form ("Flight Warning Application"). It surveys numerous data derived from all the systems of the aircraft, and in certain warning situations generates commands to emit acoustic (sounds, syntheses and hybrids) and visual (indicator lights or texts: memos and procedures, etc.) warning messages.

In the described embodiment, this avionic module is an integrated modular avionic module, and more precisely an LRM, in this case a CPIOM module (an acronym representing in English terminology "Core Processing & Input-Output Module"), which is a shared calculating resource capable of exchanging input and output data with other electronic modules.

Application code 200 is recorded in a memory (not illustrated) of avionic module 100. Nevertheless, application code 200 can be recorded in a memory that is not contained in module 100 or be distributed in the memories of a plurality of modules, the calculating resources being shared, as has been seen.

A complete inventory of possible abnormal situations is defined in the flight warning system. To each abnormal situation there is assigned an identifier serving as reference, a logic unit for activating the alarm based on signals received from monitored systems, and the table of warning messages emitted in the cockpit associated with each alarm (visual messages on screens, acoustic emissions, illumination of indicator lights).

The default contents of the warning messages defined during design of the warning system are stored in a read-only memory (not illustrated) of avionic module 100.

Application 200 is designed in such a way that the content data of the text messages can be modified without the need to change the application, which would represent a cumbersome industrial process. This is why application 200 is said to be reconfigurable.

The current contents of warning messages to be emitted in case of detection of abnormal situations are recorded in a portion (or memory zone) of memory 110, which is a random-access memory.

The default contents of the warning messages to be emitted are recorded in another memory portion (not illustrated) of read-only memory. In the described situation, the current contents are identical to the default contents.

Memory portion 110 is a random-access memory portion, but it could be a rewritable read-only memory portion or another type of memory.

Referring to FIG. 1, three types of aircraft system are being monitored by the flight warning system. In the illustrated case, a calculator 400 manages a jet engine, a calculator 410 manages a landing gear and a calculator 420 manages a fuel tank.

Different abnormal situations are associated with these three systems. In the illustrated situation, two abnormal situations S1 and S2, or particular states, are associated with calculator 400 managing a jet engine. Situation S1 is a situation in which the jet engine fails to start, and the alarm is entitled ENG2 START FAULT.

The default content of the warning message associated with situation S1 is, for example:

| ENG2 START FAULT | |
|---|---|
| EGT OVERLIMIT | |
| ENG 2 MASTER | OFF |
| ENG START SEL | CRANK |
| AFTER 30 S: | |
| ENG START SEL | NORM |
| ENG 2 MAN START | OFF |

The commands to emit warning messages (comprising visual and acoustic messages), denoted by reference 8 in FIG. 1, are emitted by application 200 in the warning situations.

A memory portion 120, integrated in the interior of avionic module 100, is intended to contain a database for personalization of application 200.

A second memory portion 130 of avionic module 100 is intended to contain another database for personalization of application 200.

By convention, one of memory portions 120 and 130 is intended to receive a database developed by the aircraft manufacturer, and the other memory portion is intended to receive a database developed by the airline company that operates the airplane.

These two databases contained in memory portions 120 and 130 are empty by default.

Each of these databases can contain different types of information items.

In the illustrated embodiment, the database contained in memory portion 120 is a relative database, by convention defined in application 200: it contains the required evolutions of the warning message contents defined relative to the current warning message contents.

With this relative database, it was decided that, by convention, the information actually to be communicated to the crew (in case of detection of an abnormal situation of a monitored system whose configuration is different from the default configuration) is obtained from the default content of the message associated with the abnormal situation:
- by suppression (or inhibition) of part of the current message (or even of the entire current message);
- by addition of a message portion to the current message;
- by a combination of such suppression and such addition;
- by modification of the current message.

In the described embodiment, a database referred to as an "envelope" base is introduced into the on-board electronics of the aircraft. It was produced in multiple copies by the airplane manufacturer, and was provided thereby to the airline companies owning airplanes of the model under consideration.

This database contains several elements known as ETC ("ECAM Temporary Changes" in English, or in other words temporary changes of the ECAM), each ETC possessing an identifier and a title.

Each ETC, or modification information item, contains modifications to be made to the content of a warning (warning message) of the flight warning system, according to the modification rules presented hereinabove.

The "envelope" database contains numerous ETCs, among which many are not applicable to the type of airplane under consideration.

The "envelope" database is introduced into the on-board electronics of the aircraft during a step 1 of delivery by means of a second on-board system, in this case a data-downloading system 300 designated as DLCS.

The DLCS is an on-board system dedicated to loading data and configuring the address of all the avionic systems, and whose acronym in English terminology means "Data Loading & Configuration System".

A maintenance operator uses a maintenance computer, which can be, for example, a PC-compatible computer installed permanently in the airplane or a portable computer linked by a temporary connection to the on-board electronics.

Into this computer the operator inserts a memory medium, such as a CD ROM or a USB key containing the "envelope" database.

The "envelope" database can also be stored in advance in the computer if the latter is portable. Alternatively, a radio network can be used to communicate with a server external to the airplane and thus transfer the "envelope" database remotely.

The "envelope" database is thus communicated to data-downloading system 300, which makes it available to the flight warning system by recording it in memory portion 120 mentioned above.

Communication between the DLCS and the flight warning system takes place via multiplexed communication networks composed of a broadcast bus or of Ethernet cables. Other means of electrical communication in networks may also be used.

In addition, an operator introduces selection information items into the on-board electronics, permitting extraction or selection of certain data within the "envelope" database. These extracted or selected data make it possible to achieve the desired modification of the content of the text message in the on-board flight warning system.

These selection information items make it possible to select the information elements ETC that must be applied to the aircraft unit under consideration.

In the described embodiment, this introduction takes place via a man-machine interface. The interface used is an on-board maintenance terminal controlled by centralized maintenance system 310 known as CMS (acronym for "Central Maintenance System") communicating with the incorporated test function known as BIT (acronym for "Built-In Test"; also known as BITE for "Built-In Test Equipment") of the warning system, the BIT function operating in interactive mode.

During a step 2, the operator delivers the identifiers of the ETCs to be applied to the flight warning system of the airplane under consideration to the on-board electronics via the CMS. The CMS transmits the identifiers of the ETCs to be applied to the flight warning system. These selection information items are written into a memory zone 140.

Communication between the CMS and the flight warning system also takes place via multiplexed communication networks composed of a broadcast bus or of Ethernet cables or of other means of electrical communication in networks.

Application 200 possesses a selection function and is therefore a selection tool: it is capable of selecting outside the envelope database the ETCs selected on the basis of information items introduced manually by the operator into the on-board electronics.

It also possesses a personalization function: once it has been loaded into module 100, the "envelope" database is then interpreted by application 200, which consequently modifies the text message content characteristics in memory portion 110 (step 2 in FIG. 1).

In step 3, application 200 applies the suppressions or additions defined in the selected ETC extracted from the "envelope" database to each warning message current content.

This step can take place as soon as the envelope database and identifiers have been delivered, or else later.

In effect, the delivery of the envelope database and identifiers to application 200 is sufficient to permit, in case of need—for example, at the moment that a warning process is tripped—suppressions and additions to be effected. In the described situation, following a modification of the effective configuration of the FADEC ("Full Authority Digital Electronics Control", an interface system between the cockpit and the jet engine), the decision is made to modify or update the content of the visual message displayed by flight warning application 200. In the case of detection of abnormal situation S1, this modification or update takes place in such a way that the content is adapted to the configuration of the FADEC present on board the airplane (effective configuration of the system).

In the example described here, the selected ETC contains the following instruction:

<the line ".AFTER 30 S :" must be changed to
".AFTER 60 S :"> and the new content of the warning message is therefore

| ENG2 START FAULT | |
|---|---|
| EGT OVERLIMIT | |
| ENG 2 MASTER | OFF |
| ENG START SEL | CRANK |
| AFTER 60 S | |
| ENG START SEL | NORM |
| ENG 2 MAN START | OFF |

According to a variant of this embodiment, memory portion 120 intended to receive the database containing the modification information items could be in an avionic module different from that dedicated to the flight warning application, that may or may not be dedicated to another on-board system.

Figure 2:
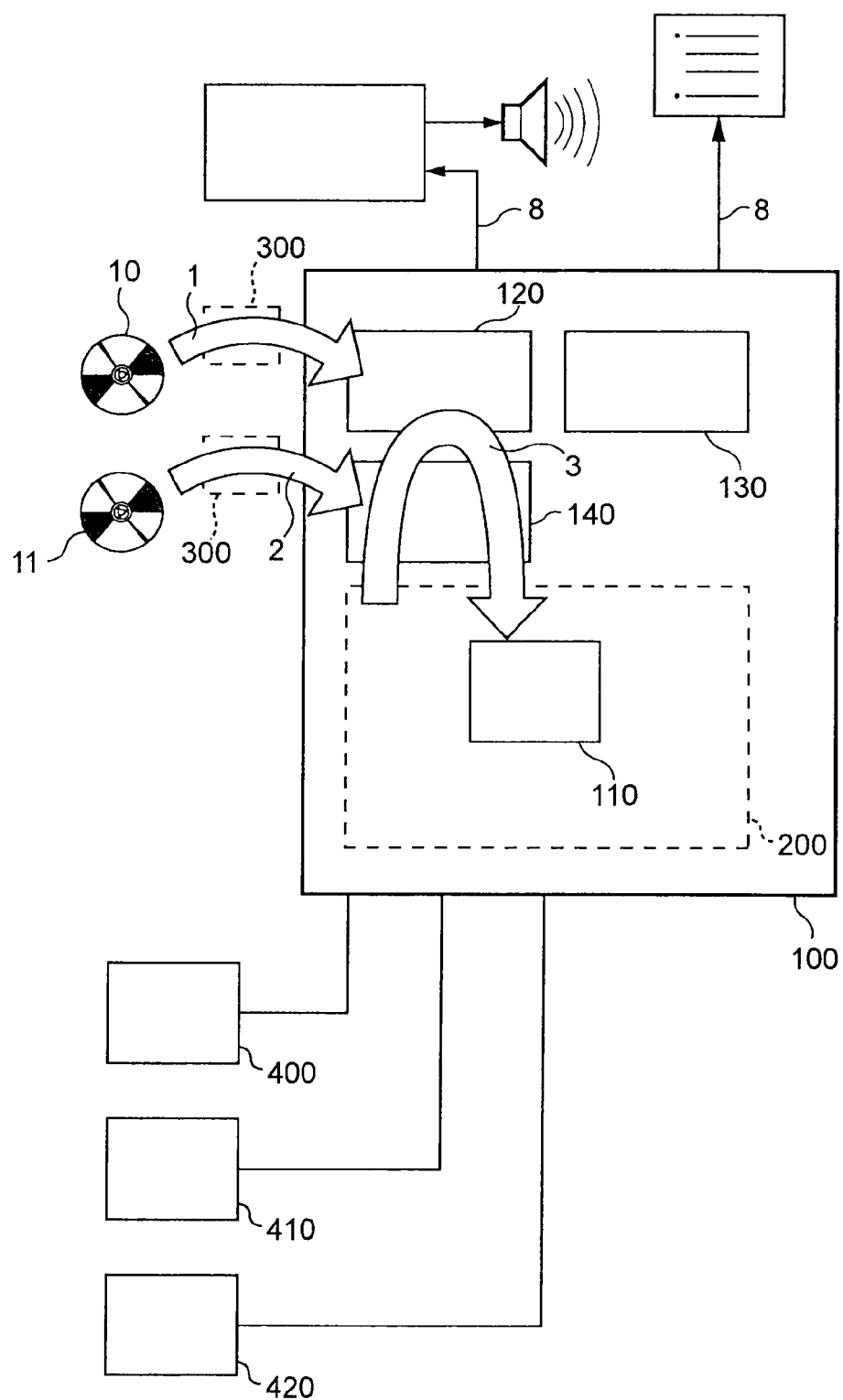

In a second embodiment, described in FIG. 2, the delivery of ETC activation codes to the on-board flight warning system is achieved via the downloading interface controlled by the DLCS, instead of being performed via man-machine interface. A database 11 containing the activation information items is introduced into the DLCS. The delivery of the "envelope" database to the flight warning system, and the delivery of selection information items, or in other words the ETC identifiers, therefore take place by the same path and in the same form. They take place successively, but they can also be achieved at the same time.

Figure 3:
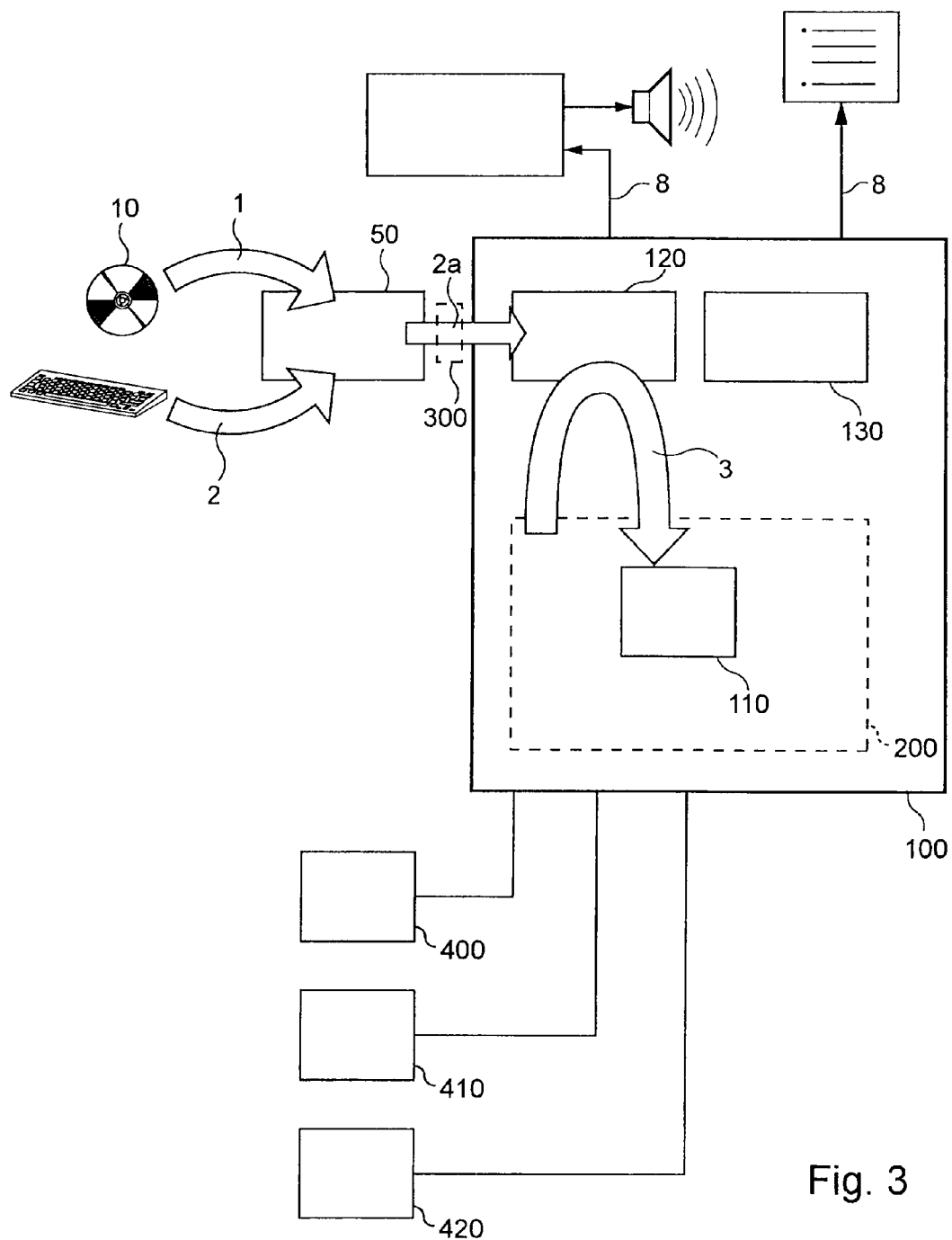

In a third embodiment, represented in FIG. 3, selection of the ETCs of the database referred to as "envelope" to be applied to the flight warning system of the aircraft is effected by a selection tool external to the on-board electronics of the aircraft. This is an electronic system 50, in the present case a fixed or portable computer. It is used on the ground by a maintenance agent, in accordance with known techniques, at a distance from or in the proximity of the airplane, or in the airplane during a maintenance inspection thereof, if the electronic system is portable.

The maintenance agent introduces "envelope" database 10 into the computer via a data downloading interface, then manually introduces the identifiers of the ETCs to be used for the aircraft in question via a keyboard. According to an alternative embodiment, the ETCs can be introduced into electronic system 50 via a downloading interface.

A reduced database is then made available to the maintenance agent, who transports it into the airplane (step 2a) on any available medium whatsoever, which can be a radio wave, a portable physical communication medium such as a USB key or a CD ROM, or a cable connection for example (transfer may or may not be automatic) in accordance with known techniques.

The reduced database is introduced into the flight warning system via DLCS 300 or into the on-board electronics in such a way that the reduced database is available to the flight warning system.

This then uses this reduced database to assign the updated content to the warning messages at the appropriate time, that is, immediately or when it proves to be necessary, as explained in connection with the first embodiment.

Figure 4:
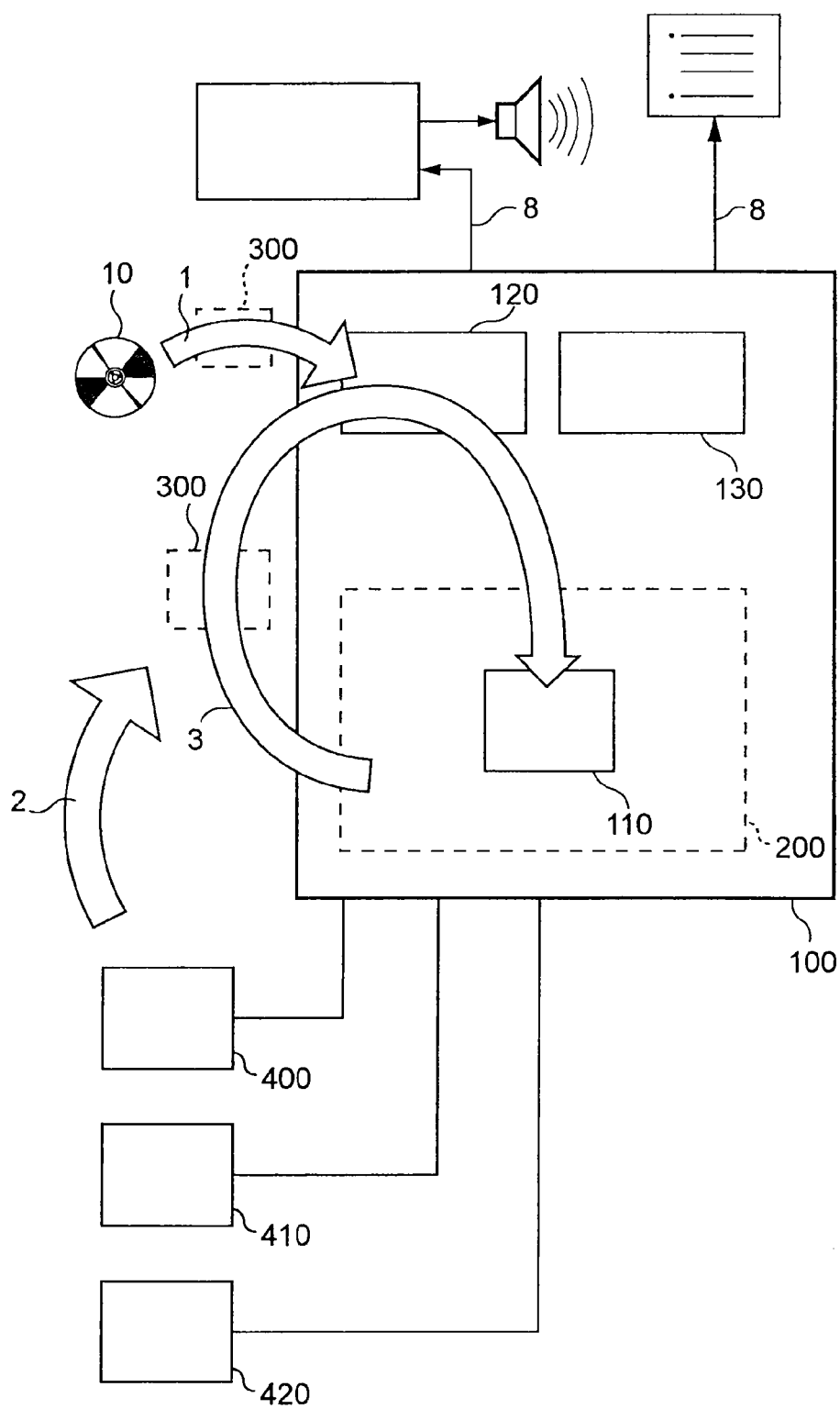

In a fourth embodiment, represented in FIG. 4, an on-board aircraft system contains information items that make it possible to choose the ETCs that must be used to modify the warning message contents to be modified.

More precisely, this on-board system is DLCS 300, and it possesses in memory the list of configurations of the monitored systems of the aircraft, updated automatically upon each modification of the configurations of the monitored systems of the aircraft.

It is noted that the on-board system containing the list of configurations of the monitored systems of the airplane in memory could be a system different from the DLCS, that may or may not be dedicated to storage of configurations in memory.

In this embodiment, a maintenance agent introduces "envelope" database 10 via the DLCS.

It is understood that, during a modification (by maintenance, for example) of a configuration of a monitored system during the life of the airplane, an information item permitting a selection to be made in the envelope database when it is introduced into the on-board electronics is transmitted (step 2 in FIG. 4) to the DLCS, which performs the function of information centralizing system.

The flight warning application then automatically interrogates the DLCS to identify which are the ETCs to be used, by obtaining the information items that permit selections to be made. The DLCS is also capable itself of delivering these information items to the flight warning application, the essential requirement being that these information items are made available and, for example, transmitted to the selection tool.

Taking the information items thus obtained into account, the flight warning application makes the selection and proceeds to update the warning message contents in its memory. The selection can also be made by the DLCS or by another on-board system functioning as selection tool.

Finally, it will be noted that the present invention is not limited to the embodiments described hereinabove and represented in the figures. It also relates to all variant embodiments conceivable to those skilled in the art.

For example, the database introduced into memory portion 120 can contain the evolutions required relative to the warning message contents present by default in the alarm calculator, and no longer the current contents.

Alternatively, the database can also be an absolute database, containing new warning message contents intended to replace the current contents.

In addition, the invention can be implemented with diverse avionic module architectures, especially LRUs.

The invention claimed is:
1. A method for updating a content of a given warning message emitted in an aircraft by a monitoring system in case of detection of a particular state of at least one monitored system of said aircraft, said method comprising:

a step of delivering a plurality of modification information items to a selection tool, each modification information item defining a modification of a content of a warning message of said monitoring system, a step of making available to the selection tool a selection information item that depends on an effective configuration of said at least one monitored system, the selection tool being configured to select at least one information item among said plurality of modification information items according to said selection information item, and permit modification of the said content of the said given warning message, wherein said monitoring system is part of the on-board electronics of said aircraft, and said selection tool is a system external to the on-board electronics of said aircraft, said step of making available a selection information item additionally comprising a step for delivering said selection information item to said selection tool and the method further comprising a step of transmitting the chosen information item into the on-board electronics of the aircraft.

2. A method according to claim 1, wherein the method additionally comprises a step of modifying said current content on the basis of said information item chosen by the selection tool from among the plurality of modification information items according to said selection information item.

3. A method according to claim 1, wherein said monitoring system and said selection tool are part of the on-board electronics of the aircraft.

4. A method according to claim 3, wherein the steps of making available a selection information item additionally comprises a step of delivering said selection information item to said selection tool via a man-machine interface.

5. A method according to claim 3, wherein the steps of making available a selection information item additionally comprises a step of delivering said selection information item to said selection tool via a downloading interface.

6. A method according to claim 3, wherein the steps of making available a selection information item additionally comprises a preliminary step of updating a selection information item in a memory of an electronic storage system during an intervention on said at least one monitored system.

7. A method according to claim 3, wherein said selection tool is said monitoring system.

8. A method according to claim 1, further comprising storing in a first memory onboard said aircraft a first database developed by a manufacturer of said aircraft and storing in a second memory onboard said aircraft a second database developed by an airline company that operates said aircraft, and wherein said modification information items are stored in said first database.

9. A method according to claim 1, further comprising storing in a memory onboard said aircraft a database containing evolutions of warning message contents defined relative to current warning message contents.

10. A method according to claim 1, further comprising storing said modification information items on a database onboard said aircraft, wherein said modification information items include temporary changes to an Electronic Centralized Aircraft Monitor (ECAM) for said aircraft.

11. A method according to claim 10, wherein some modification information items stored in said database are temporary changes not applicable to said aircraft.

12. A method according to claim 1, wherein the step of delivery is performed during maintenance.

13. A method according to claim 12, where said step of delivery is performed by a maintenance operator.

14. A system for updating a content of a warning message emitted in an aircraft by a monitoring system, in case of detection of a particular state of at least one monitored system of the said aircraft, said system comprising:

means for delivering a plurality of modification information items to a selection tool, each modification information item defining a modification of a content of a warning message of said monitoring system, means for selecting by said selection tool of at least one information item referred to as "chosen" from among said plurality of modification information items, according to a selection information item, means for making available to said selection tool a selection information item that depends on an effective configuration of said at least one monitored system, means for modifying said content on the basis of said chosen information item, wherein said monitoring system is part of the on-board electronics of said aircraft, and said selection tool is a system external to the on-board electronics of said aircraft, said means for making available a selection information item additionally delivers said selection information item to said selection tool and the system further comprising a means for transmitting the chosen information item into the on-board electronics of the aircraft.

15. An aircraft comprising a system according to claim 14.

16. A system according to claim 14, further comprising means for storing onboard said aircraft a first database developed by a manufacturer of said aircraft and means for storing onboard said aircraft a second database developed by an airline company that operates said aircraft, and wherein said modification information items are stored in said first database.

17. A system according to claim 14, further comprising means for storing onboard said aircraft a database containing evolutions of warning message contents defined relative to current warning message contents.

18. A system according to claim 14, further comprising an Electronic Centralized Aircraft Monitor (ECAM), and means for storing onboard said aircraft a database that contains said modification information items, wherein said modification information items stored in said database include temporary changes to said ECAM.

19. A system according to claim 18, wherein some modification information items stored in said database are temporary changes not applicable to said aircraft.

20. A system for updating a content of a warning message emitted in an aircraft by a monitoring system, in case of detection of a particular state of at least one monitored system of the aircraft, said system comprising:

a data-downloading system configured to deliver a plurality of modification information items to a selection tool, each modification information item defining a modification of a content of a warning message of said monitoring system; and a selection tool selecting at least one information item referred to as "chosen" from among said plurality of modification information items, according to a selection information item, the tool being configured to have a selection information item that depends on an effective configuration of said at least one monitored system being made available to said tool, wherein said monitoring system is part of the on-board electronics of said aircraft, and said selection tool is a system external to the on-board electronics of said aircraft, said data downloading system delivers said selection information item to said selection tool and the system transmits the chosen information item into the on-board electronics of the aircraft.

21. A system according to claim 20, wherein the data-downloading system is configured to be used during maintenance.

22. A method for updating a content of a given warning message emitted in an aircraft by a monitoring system in case of detection of a particular state of at least one monitored system of said aircraft, said method comprising:
- a step of delivering a plurality of modification information items to a selection tool, each modification information item defining a modification of a content of a warning message of said monitoring system,
- a step of making available to the selection tool a selection information item that depends on an effective configuration of said at least one monitored system,
- the selection tool being configured to select at least one information item among said plurality of modification information items according to said selection information item, and permit modification of the said content of the said given warning message, wherein said monitoring system and said selection tool are part of the on-board electronics of the aircraft.

23. A system for updating a content of a warning message emitted in an aircraft by a monitoring system, in case of detection of a particular state of at least one monitored system of the aircraft, said system comprising:
- a data-downloading system configured to deliver a plurality of modification information items to a selection tool, each modification information item defining a modification of a content of a warning message of said monitoring system; and
- a selection tool selecting at least one information item referred to as "chosen" from among said plurality of modification information items, according to a selection information item, the tool being configured to have a selection information item that depends on an effective configuration of said at least one monitored system being made available to said tool, wherein said monitoring system and said selection tool are part of the on-board electronics of the aircraft.

* * * * *